(12) United States Patent
Romano et al.

(10) Patent No.: US 9,749,070 B1
(45) Date of Patent: Aug. 29, 2017

(54) SAMPLING THRESHOLD DETECTOR FOR DIRECT MONITORING OF RF SIGNALS

(71) Applicant: Maxlinear Asia Singapore PTE LTD., Singapore (SG)

(72) Inventors: Russell Romano, Allentown, PA (US); Anthony Eugene Zortea, Pipersville, PA (US)

(73) Assignee: MAXLINEAR ASIA SINGAPORE PTE LTD., Singapore (SG)

( * ) Notice: Subject to any disclaimer, the term of this patent is extended or adjusted under 35 U.S.C. 154(b) by 0 days.

(21) Appl. No.: 15/000,666

(22) Filed: Jan. 19, 2016

Related U.S. Application Data

(63) Continuation of application No. 13/909,537, filed on Jun. 4, 2013, now Pat. No. 9,271,163.

(51) Int. Cl.
| | |
|---|---|
| *H04B 17/318* | (2015.01) |
| *H04B 1/16* | (2006.01) |
| *H04L 27/06* | (2006.01) |
| *H04L 1/00* | (2006.01) |
| *H04L 25/06* | (2006.01) |

(52) U.S. Cl.
CPC .............. *H04B 17/318* (2015.01); *H04B 1/16* (2013.01); *H04L 1/0045* (2013.01); *H04L 25/067* (2013.01); *H04L 27/06* (2013.01)

(58) Field of Classification Search
CPC ......... H04B 17/318; H04B 1/16; H04L 27/06; H04L 25/067; H04L 1/0045
See application file for complete search history.

(56) References Cited

U.S. PATENT DOCUMENTS

| | | | |
|---|---|---|---|
| 5,936,462 | A | 8/1999 | Muraishi |
| 6,498,926 | B1 | 12/2002 | Ciccarelli et al. |
| 6,977,531 | B2 | 12/2005 | Chien |
| 7,236,014 | B1 | 6/2007 | McQuirk et al. |

(Continued)

FOREIGN PATENT DOCUMENTS

WO 2008060672 A1 5/2008

OTHER PUBLICATIONS

U.S. Appl. No. 13/909,537, Office Action dated Apr. 10, 2015.
(Continued)

*Primary Examiner* — Janice Tieu
(74) *Attorney, Agent, or Firm* — McAndrews, Held & Malloy, Ltd.

(57) ABSTRACT

The peak level of a high frequency analog signal in an RF receiver is detected by a system which samples the signal and compares it against a static threshold, generating an above/below status. The system is implemented with a sampler of sufficient aperture bandwidth to capture the signal in question, operated at a clock frequency, dynamically chosen as a function of $f_{LO}$ (local oscillator frequency) and the desired $f_{IF}$ (intermediate frequency), to minimize in-band intermodulation products. The sampler produces kickback intermodulation products that are positioned out-of-band, or are of low enough power in-band so as to be inconsequential. Samples are taken for a statistically significant period of time, and the status is used to adapt the threshold to systematically determine the peak amplitude of the signal being observed.

18 Claims, 11 Drawing Sheets

(56) References Cited

U.S. PATENT DOCUMENTS

| | | | |
|---|---|---|---|
| 7,352,240 B2 | 4/2008 | Dupuis | |
| 7,436,900 B2 * | 10/2008 | Hoffmann | H03F 1/3229 |
| | | | 330/149 |
| 8,144,817 B1 * | 3/2012 | Savoj | H04L 27/0006 |
| | | | 348/449 |
| 2002/0127986 A1 | 9/2002 | White et al. | |
| 2003/0072224 A1 | 4/2003 | Ando | |
| 2010/0290504 A1 | 11/2010 | Torimoto et al. | |
| 2012/0034895 A1 | 2/2012 | Xuechu et al. | |

OTHER PUBLICATIONS

U.S. Appl. No. 13/909,537, Office Action dated Oct. 10, 2014.
U.S. Appl. No. 13/909,537, Notice of Allowance dated Oct. 19, 2015.

* cited by examiner

SAMPLING THRESHOLD DETECTOR FOR DIRECT MONITORING OF RF SIGNALS

CROSS REFERENCE TO RELATED APPLICATIONS

This application is a continuation of U.S. patent application Ser. No. 13/909,537 filed on Jun. 4, 2013, which is incorporated herein by reference in its entirety.

FIELD

The present disclosure relates to detection of electrical signals, including but not limited to radio frequency (RF) signal peak detection.

BACKGROUND

In order to maximize the usable dynamic range of a receiver (or other system), it is necessary to control the gain of the signal path in that system. In order to optimally set the gain, one must have a clear indication of the amplitude of the signal at the point being optimized. Detecting a sensitive RF signal, without distorting the signal through observation, is a problem to be addressed to allow a robust implementation of such a system.

FIG. 1 illustrates a block diagram of a typical RF receiver 10. The RF receiver 10 will monitor the signal amplitude at several points along the path, and adjust associated gain and attenuation stages accordingly.

A peak detector 12 is typically used to quantify the peak amplitude of a signal. A threshold detector can be considered a simplified sub-component of a peak detector, where the function is simplified to indicate if a given signal is larger or smaller than a particular threshold. A threshold detector can be combined with a control system which manipulates the reference threshold to systematically determine the peak of the signal, thereby achieving the same function of the original peak detector.

A peak detector is a circuit that detects the time varying peak amplitude of an analog signal. As the frequency of these input signals increases, and the precision with which their peak must be quantified increases, this task becomes more difficult to accomplish. Analog peak detectors, utilizing the inherent physical characteristics of transistors to track and capture a peak of a signal, do not perform this task well as speeds increase and signal amplitudes fall. In particular, it is difficult to track small amplitudes in deep submicron technologies using traditional analog circuit topologies due to high inherent offsets and unpredictable, or poorly characterized, sub-threshold device behavior.

Examples of known RF signal peak detectors are provided in the following, each of which is incorporated by reference in its entirety: U.S. Pat. No. 6,977,531, U.S. Pat. No. 7,236,014, and U.S. Pat. No. 7,352,240.

A digital sampling peak detector is attractive for its high precision over analog detection mechanisms, but the introduction of a clock signal in a system requiring high linearity is difficult to manage.

Therefore, it is desirable to provide a sampling detector architecture to monitor sensitive RF signals.

BRIEF DESCRIPTION OF THE DRAWINGS

Embodiments of the present disclosure will now be described, by way of example only, with reference to the attached Figures.

DETAILED DESCRIPTION

Figure 1:
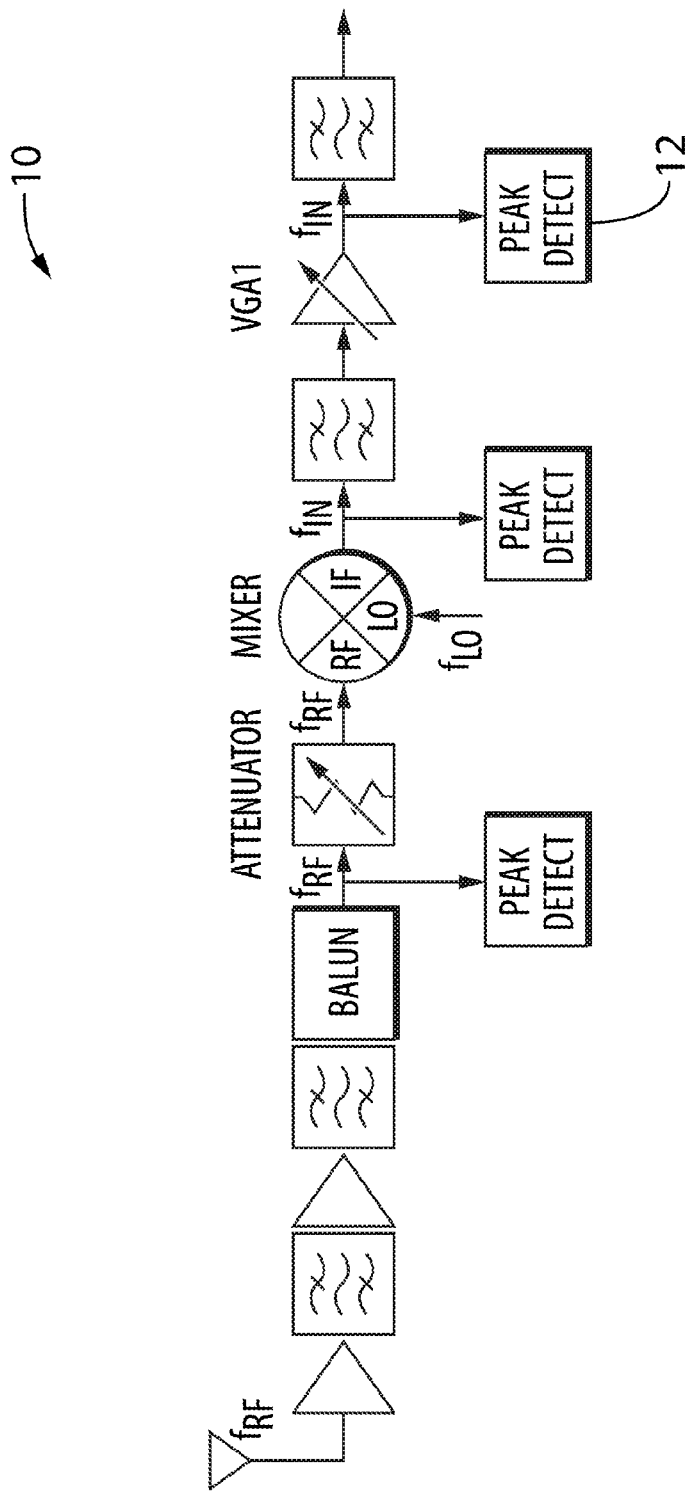
FIG. 1 illustrates a block diagram of a typical RF receiver.

The peak level of a high frequency analog signal in an RF receiver is detected by a system which samples the signal and compares it against a static threshold, generating an above/below status. The system is implemented with a sampler of sufficient aperture bandwidth to capture the signal in question, operated at a clock frequency, dynamically chosen as a function of $f_{LO}$ (local oscillator frequency) and the desired $f_{IF}$ (intermediate frequency), to minimize in-band intermodulation products. The sampler produces kickback intermodulation products that are positioned out-of-band, or are of low enough power in-band so as to be inconsequential. Samples are taken for a statistically significant period of time, and the status is used to adapt the threshold to systematically determine the peak amplitude of the signal being observed.

Embodiments of the present disclosure utilize a single high bandwidth sampler, carefully isolated from the signal path and clocked at a frequency, specifically calculated for the particular application, as the core of a digital system to provide accuracy in amplitude measurements that would not be possible in an analog detector. This method allows for direct sampling of an RF signal without introducing in-band distortion products.

In an embodiment, the present disclosure provides a sampling threshold detector for monitoring a band to detect when a threshold is exceeded in an RF signal, comprising: a sampler configured to sample the RF signal at a sampling clock frequency proportional to a local oscillator frequency ($f_{LO}$) and to position out-of-band kickback intermodulation products that are produced by operation of the sampler.

In an example embodiment, the sampler comprises a single high bandwidth sampler. In an example embodiment, the sampling clock frequency is determined based on the local oscillator frequency ($f_{LO}$) and the baseband signal ($f_{IF}$). In an example embodiment, the sampling clock frequency $f_{SAMP}$ is determined according to $f_{SAMP}=f_{LO}+N*f_{IF}$, where N is an integer that results in a positive sampling frequency within the acceptable operating range of the sampler.

In an example embodiment, the sampling threshold further comprises a machine readable memory storing a set of candidate sampling clock frequency values from which the sampling clock frequency for the sampler is selected.

In an example embodiment, the sampling threshold detector further comprises: a passive attenuator configured to receive the RF signal to monitor higher voltages to provide a reverse path attenuation of noise generated by the sampling circuitry; and a continuous time pre-amplifier configured to receive the output of the passive attenuator and to subtract a static programmable threshold voltage therefrom and to provide the resulting signal to the sampler as the RF signal to be sampled.

In an example embodiment, the sampling threshold detector further comprises a filter provided before the continuous time pre-amplifier and configured to selectively determine, based on characteristics of the filter, a frequency band of the RF signal to be observed with respect to excursions above the threshold. In an example embodiment, the sampler comprises a single high bandwidth sampler directly attached to the RF signal, enabling direct monitoring of the RF signal.

In a further embodiment, the present disclosure provides a method of sampling threshold detection comprising: selecting a sampling clock frequency based on a local oscillator frequency; operating a single high bandwidth sampler at the selected sampling clock frequency to position out-of-band kickback intermodulation products produced by operation of the sampler; and monitoring an RF signal using the single high bandwidth sampler.

In an example embodiment, the method further comprises: pre-calculating intermodulation products for each signal to be received; and selecting the sampling clock frequency additionally based on the pre-calculated intermodulation products.

In an example embodiment, the method further comprises: calculating at run-time intermodulation products for each signal to be received; and selecting the sampling clock frequency additionally based on the pre-calculated intermodulation products.

In an example embodiment, the final folded results of the kickback intermodulation products are positioned out of band, or are of low enough power in-band so as to be inconsequential.

In an example embodiment, the sampling clock frequency is determined based on the local oscillator frequency ($f_{LO}$) and the baseband signal ($f_{IF}$). In an example embodiment, the sampling clock frequency $f_{SAMP}$ is determined according to $f_{SAMP}=f_{LO}+N*f_{IF}$, where N is an integer that results in a positive sampling frequency within the acceptable operating range of the sampler.

In an example embodiment, the method further comprises storing a set of candidate sampling clock frequency values from which the sampling clock frequency for the sampler is selected.

In an example embodiment, the method further comprises: receiving the RF signal to monitor higher voltages to provide a reverse path attenuation of noise generated by the sampling circuitry; and subtracting a static programmable threshold voltage from to provide the resulting signal to the sampler as the RF signal to be sampled.

In an example embodiment, the method further comprises: filtering a frequency band of the RF signal to be observed with respect to excursions above the threshold.

In an example embodiment, the method further comprises: directly monitoring the RF signal by sampling the RF signal using a single high bandwidth sampler directly attached to the RF signal.

According to an embodiment of the present disclosure, there are two basic requirements in selecting a clock frequency for a sampling detector. First, the clock rate may not be an integer multiple (or divisor) of the RF signal being monitored. Second, the samples must be taken at all points along the RF signal period or they may not catch the periodic peak level the RF signal attains.

A clocked circuit will always produce some measureable amount of kickback or noise onto the signals they are connected to. One key aspect of embodiments of the present disclosure is to position those inevitable kickbacks, and the intermodulation products they create with the incoming signal, such that when they are mixed down to the baseband intermediate frequency ($f_{IF}$), they are safely out-of-band.

A typical receiver, as depicted in FIG. 1, receives an RF signal ($f_{RF}$), conditions and filters that signal, and then passes it through a mixer, driven by a local oscillator ($f_{LO}$), to create the baseband signal at $f_{IF}$, where $$f_{IF}=f_{LO}-f_{RF} \qquad \text{Equation 1}$$

Figure 2:
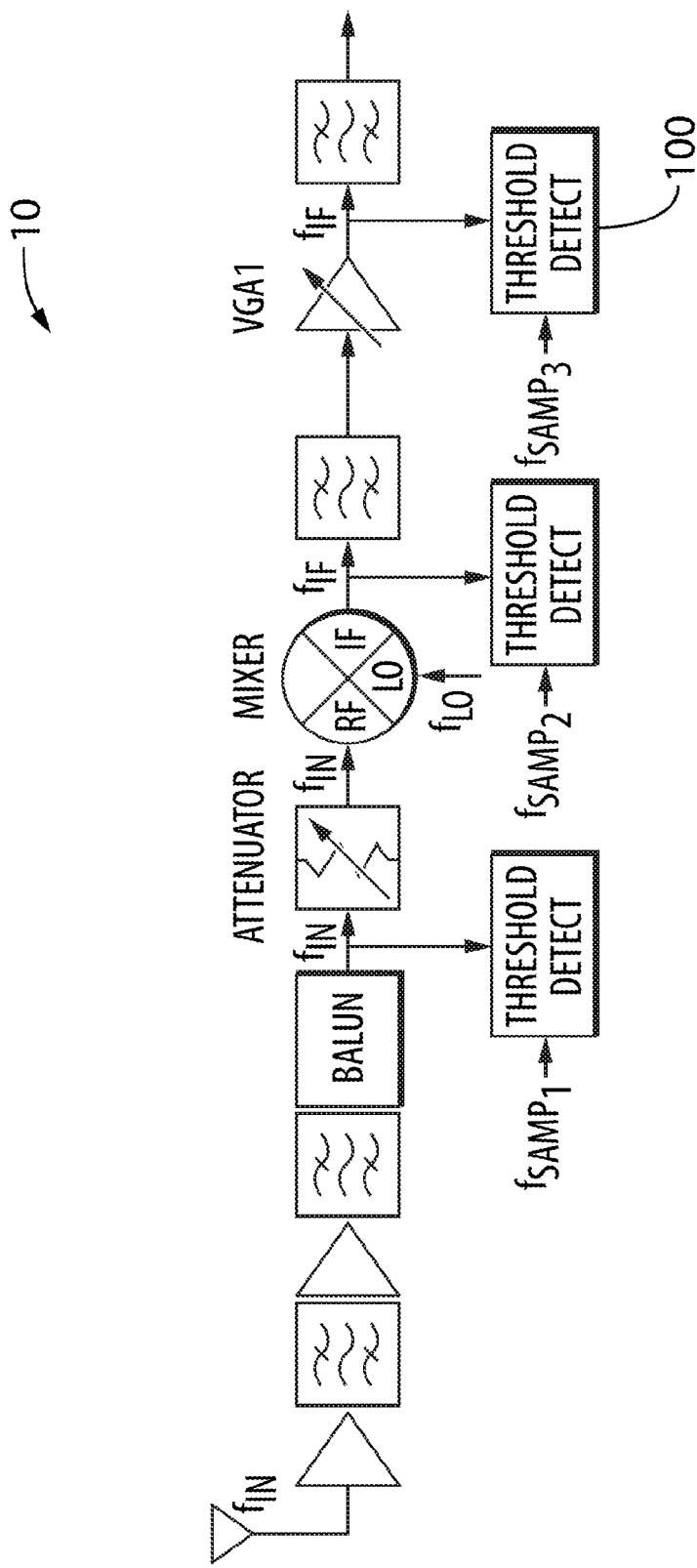
FIG. 2 illustrates a block diagram of an RF receiver using sampling detectors according to an embodiment of the present disclosure.

FIG. 2 illustrates a block diagram of an RF receiver using sampling threshold detectors 100 according to an embodiment of the present disclosure. Details regarding the sampling threshold detectors 100 will be provided later in relation to FIG. 8. In FIG. 2, an additional signal is introduced, via kickback, by the sampling threshold detector 100 clocked at rate $f_{SAMP}$. In such a case, intermodulation products will be created at many frequencies, defined by $$(N1*f_{RF}+N2*f_{SAMP}) \qquad \text{Equation 2}$$

for all combinations of N1 and N2 where N1 varies from −N to +N, and N2 varies from −N to +N, with N defining the order of the products under consideration. In different embodiments, the sampling frequencies $f_{SAMP1}$, $f_{SAMP2}$, and $f_{SAMP3}$ illustrated in FIG. 2 can be the same or different, depending on system requirements. For example, in an example embodiment, one frequency is used for the detector operating on the RF signal ($f_{SAMP1}$), and a different frequency is used on the IF signals, so $f_{SAMP2}=f_{SAMP3}$ in that embodiment. The sampling frequencies $f_{SAMP1}$, $f_{SAMP2}$, and $f_{SAMP3}$ are completely independent, but they may work out to be the same value for particular configurations in example embodiments.

This means that not only is the desired signal present at the input of the mixer, or other receiver component downstream, but all of the intermodulation products, at varying power levels, are also present. In an embodiment, the intermodulation products are not on the signal being monitored until the detector is placed on the signal to monitor it. Since it is not possible to monitor the signal without affecting it in any way, a detector according to an embodiment of the present disclosure generates undesired signals that are put back onto the signal being monitored. The mixer folds the frequency spectrum such that the content being carried at the primary input frequency, $f_{RF}$, is presented instead at the intermediate frequency, $f_{IF}$. A byproduct of this function is that all of the intermodulation products that are presented to the input of the mixer are also folded down, and if they are not properly positioned, they can land near the signal of interest, masking it from being received.

According to embodiments of the present disclosure, intermodulation products are either pre-calculated for each signal to be received, or calculated at run-time to insure that the final, folded results of the intermodulation products are positioned out of band, or of low enough power in-band so as to be inconsequential. One such equation for calculating candidate rates for $f_{SAMP}$ is $$f_{SAMP}=f_{LO}+N*f_{IF} \qquad \text{Equation 3}$$

where N is an integer that results in a positive sampling frequency within the acceptable operating range of the sampler.

This is only one equation for calculating sampling frequencies that are likely to produce manageable intermodulation products. Many other calculations and approaches can be devised, and even a brute force pre-computation of all frequencies that can be synthesized by a system may be pre-computed and tabularized according to the signal frequencies they may be used to sample.

Figure 3:
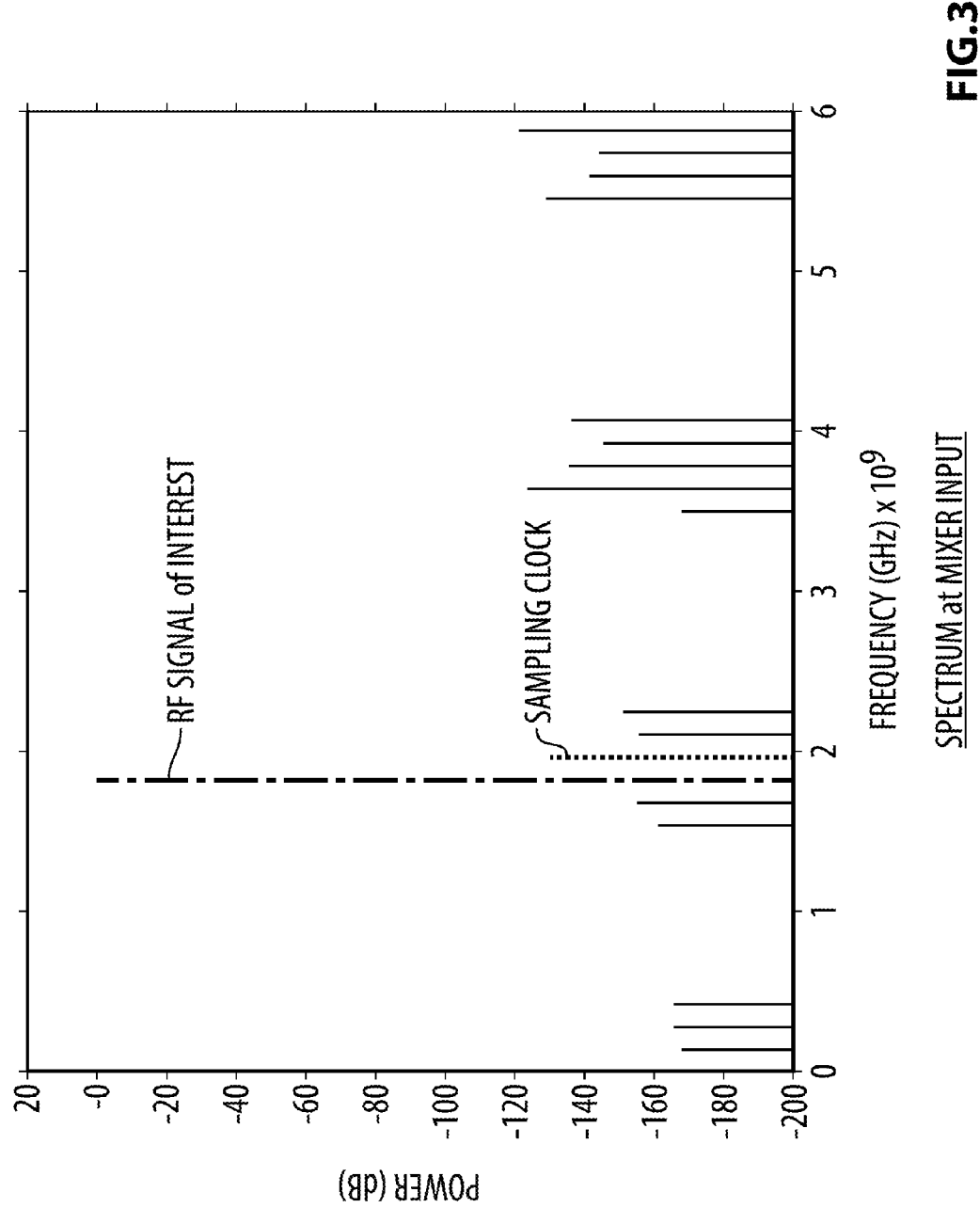
FIG. 3 illustrates a graph showing example spectrum of an RF signal with intermodulation products present.

For illustration purposes, consider a system with an incoming RF signal of 1.817 GHz, which will be mixed with a local oscillator of 1.957 GHz to produce a 140 MHz IF baseband signal. Evaluating the effects of sampling directly at $f_{LO}$ ($f_{SAMP}=f_{LO}+N*f_{IF}$, where N=0), and considering intermodulation products to the third order, a spectrum as depicted in FIG. 3 is observed.

Figure 4:
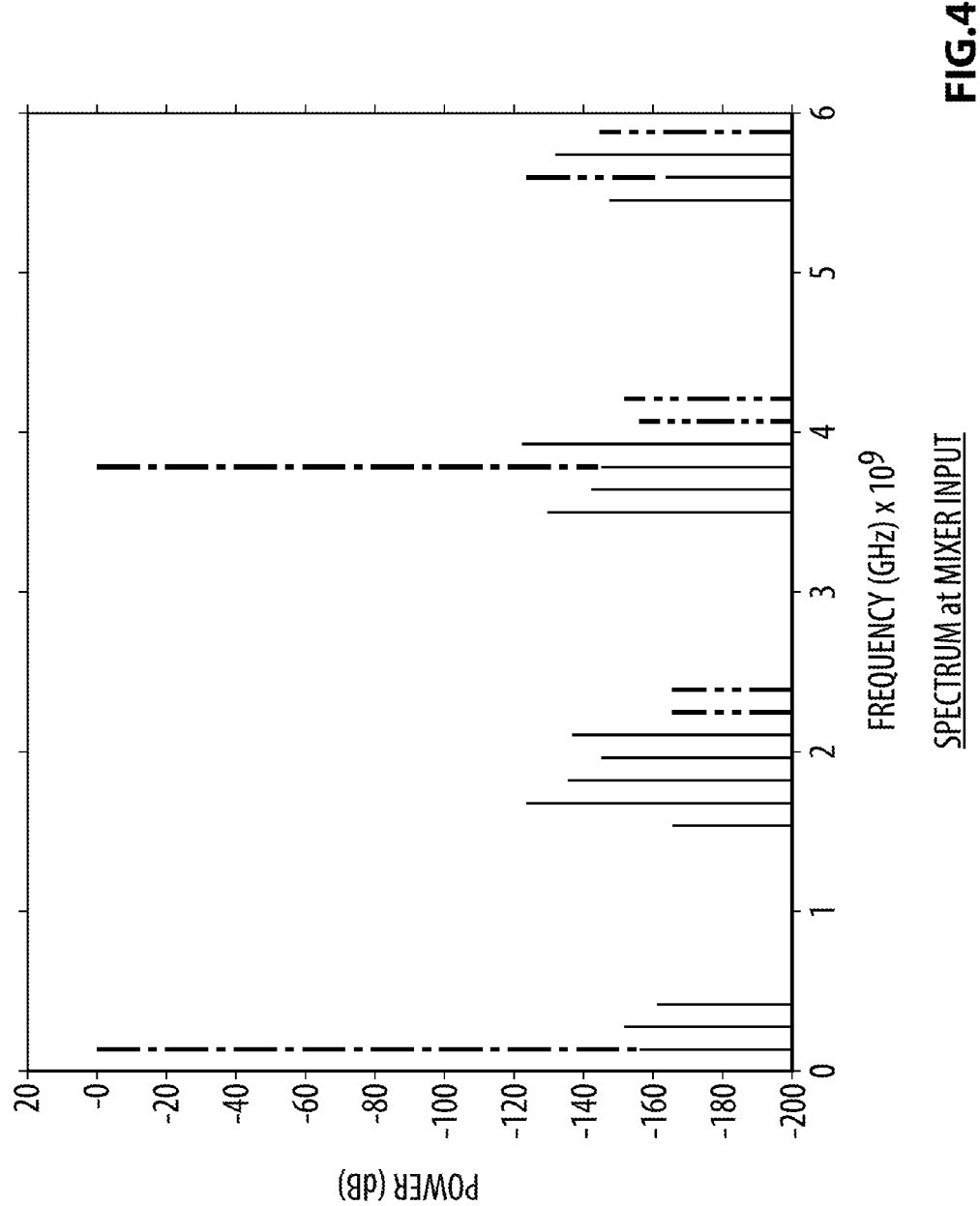
FIG. 4 illustrates a graph showing example spectrum of mixer output with intermodulation products present.
Figure 5:
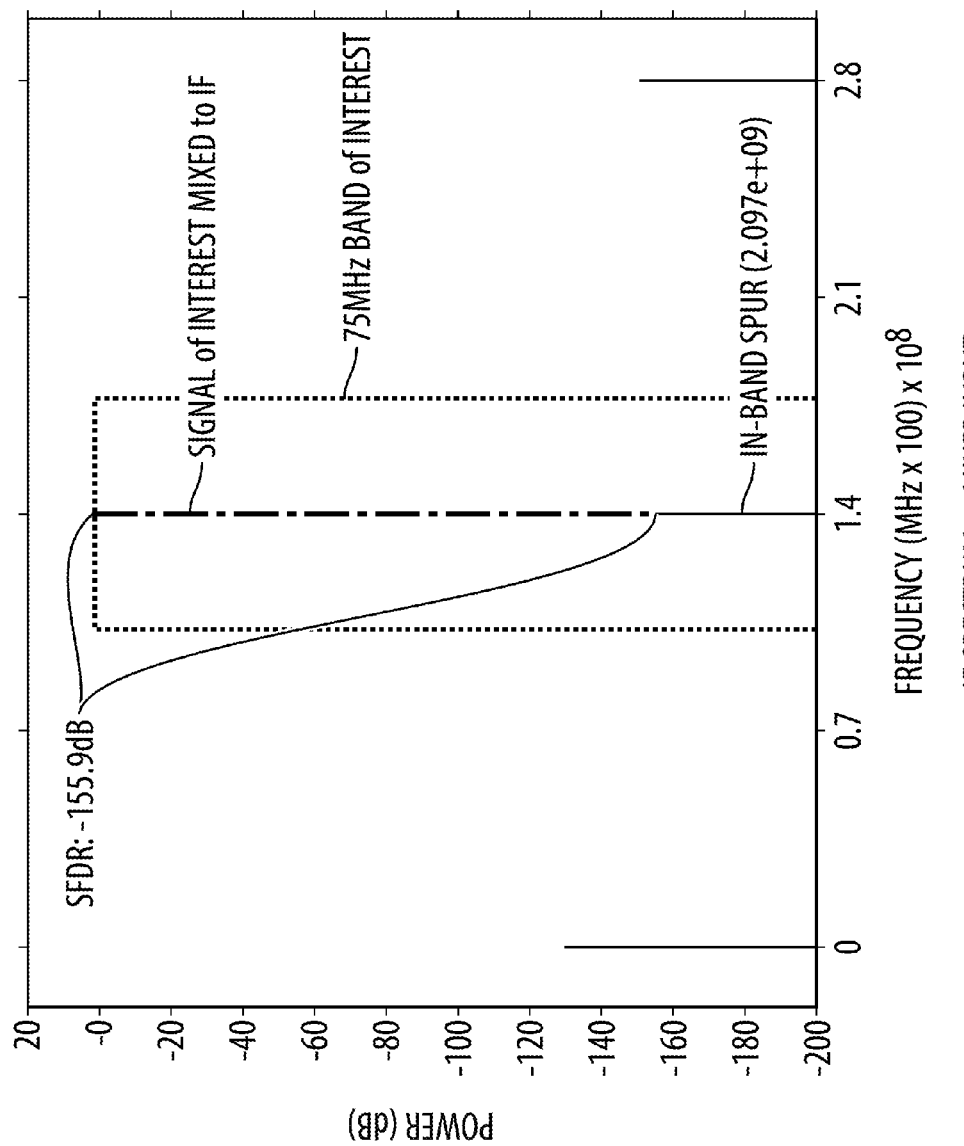
FIG. 5 illustrates a graph showing example spectrum of an IF band of interest.

When mixed to the desired baseband intermediate frequency of 140 MHz, the products land in desirable locations, as depicted in FIG. 4 and FIG. 5. As can be seen in FIG. 5, generated at $f_{SAMP}=f_{LO}$ (where N=0), sampling frequencies generated by this equation will create an intermodulation product at the image frequency of the desired signal and therefore mix directly over the signal of interest at fIF. This is an acceptable case because the image signal is a smaller version of the original RF signal, and will add constructively to the RF signal under consideration.

As shown in FIG. 5, the In-Band spur at $f_{IF}$ is the result of mixing the RF signal's image signal. As explained earlier, this is an acceptable interference product, both because of its very low signal power, and the fact that it is a smaller version of the RF signal itself and therefore does not distort the signal being monitored.

Figure 6:
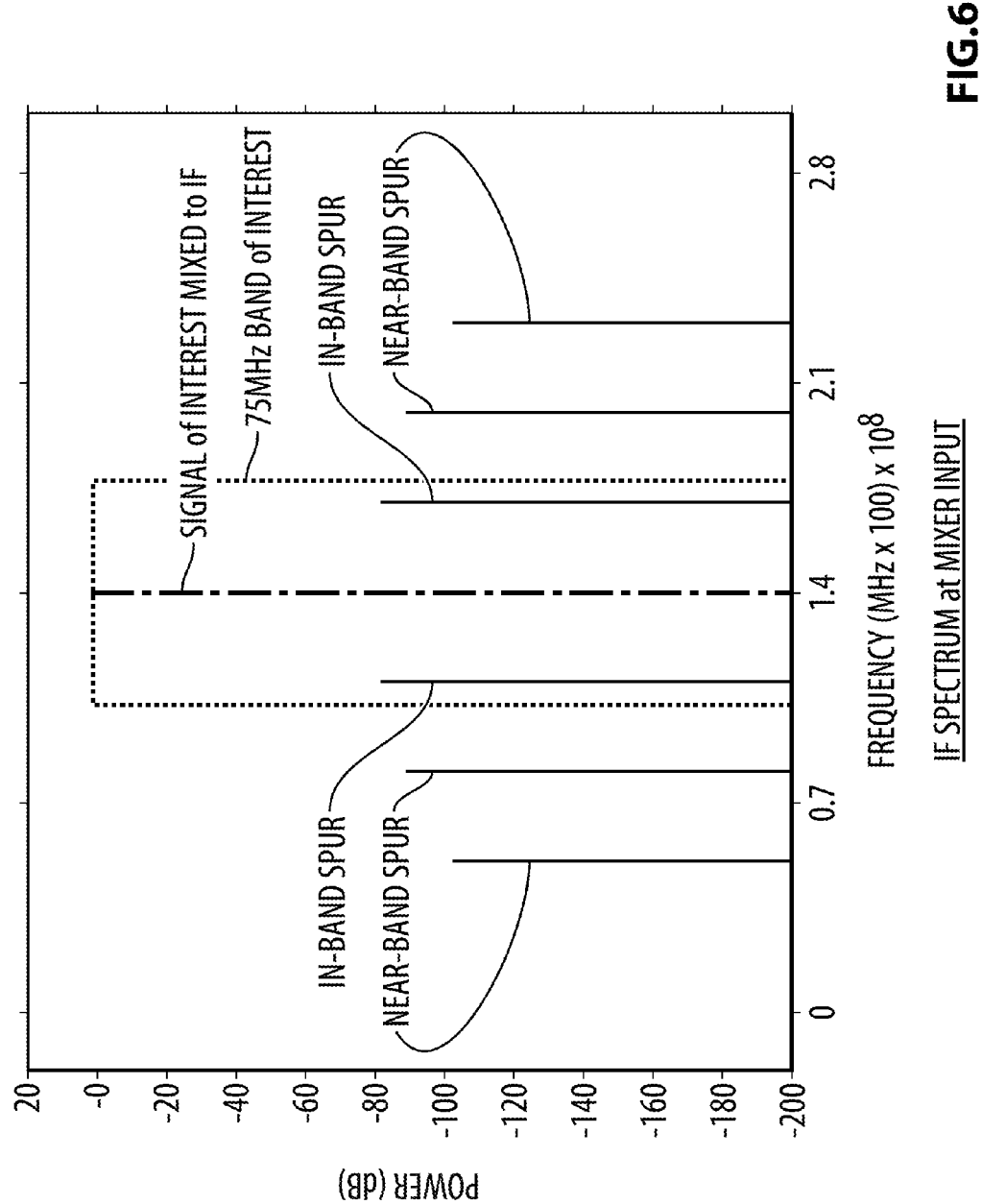
FIG. 6 illustrates a graph showing example spectrum of an IF band of interest with sampling reduced to 30 MHz.
Figure 7:
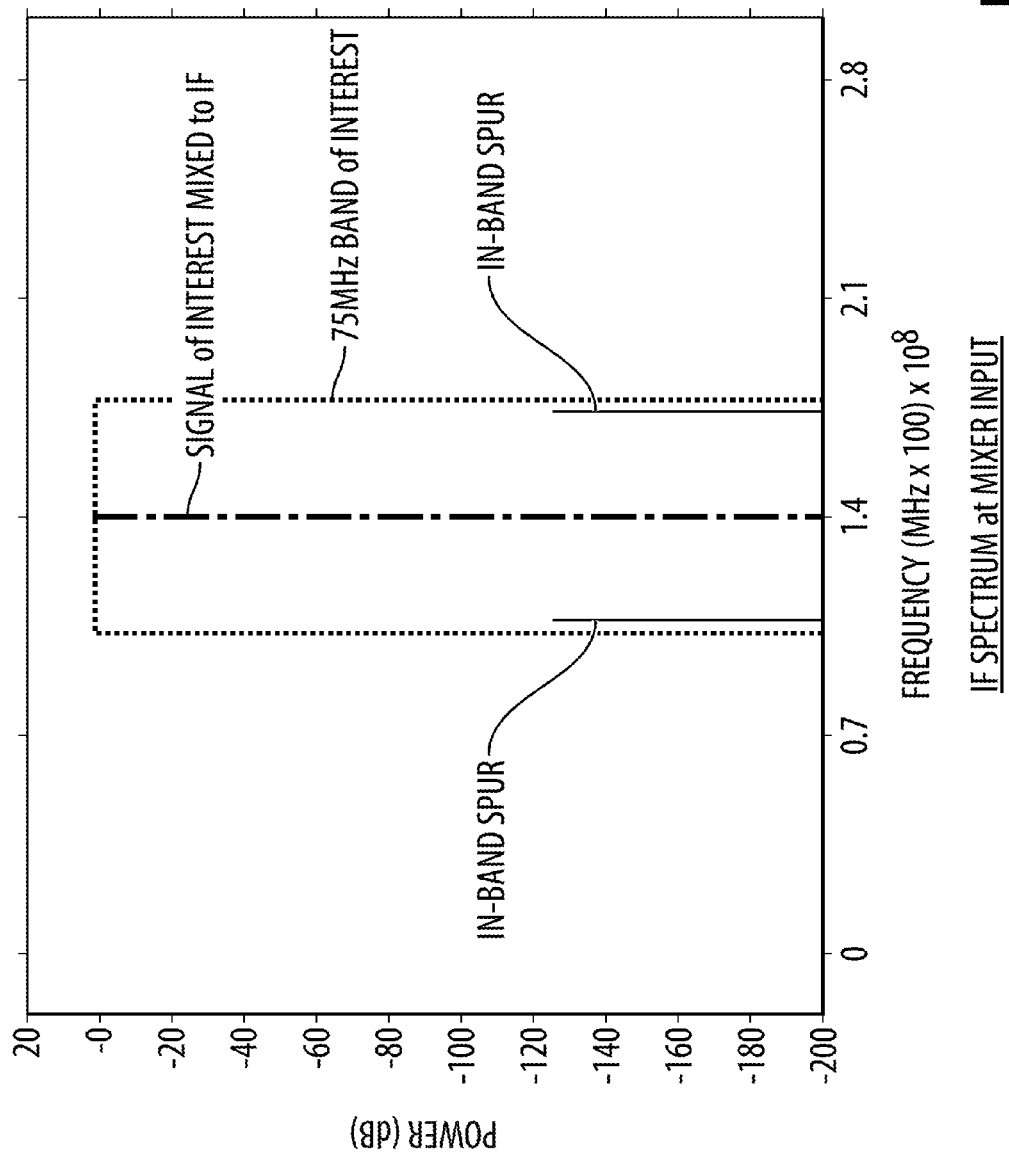
FIG. 7 illustrates a graph showing example spectrum of an IF band of interest with a sampling speed of 1.2 GHz.

To illustrate that it is not sufficient to simply clock the sampler slower in an effort to avoid the in band spurs, FIG. 6 depicts the IF band in this same scenario when sampled at just 30 MHz. Sampling faster can have similar effects. FIG. 7 depicts the IF band when the system samples at 1.2 GHz. In both examples, intermodulation products are mixed down, falling very close to the signal of interest at 140 MHz, which is undesirable.

Figure 8:
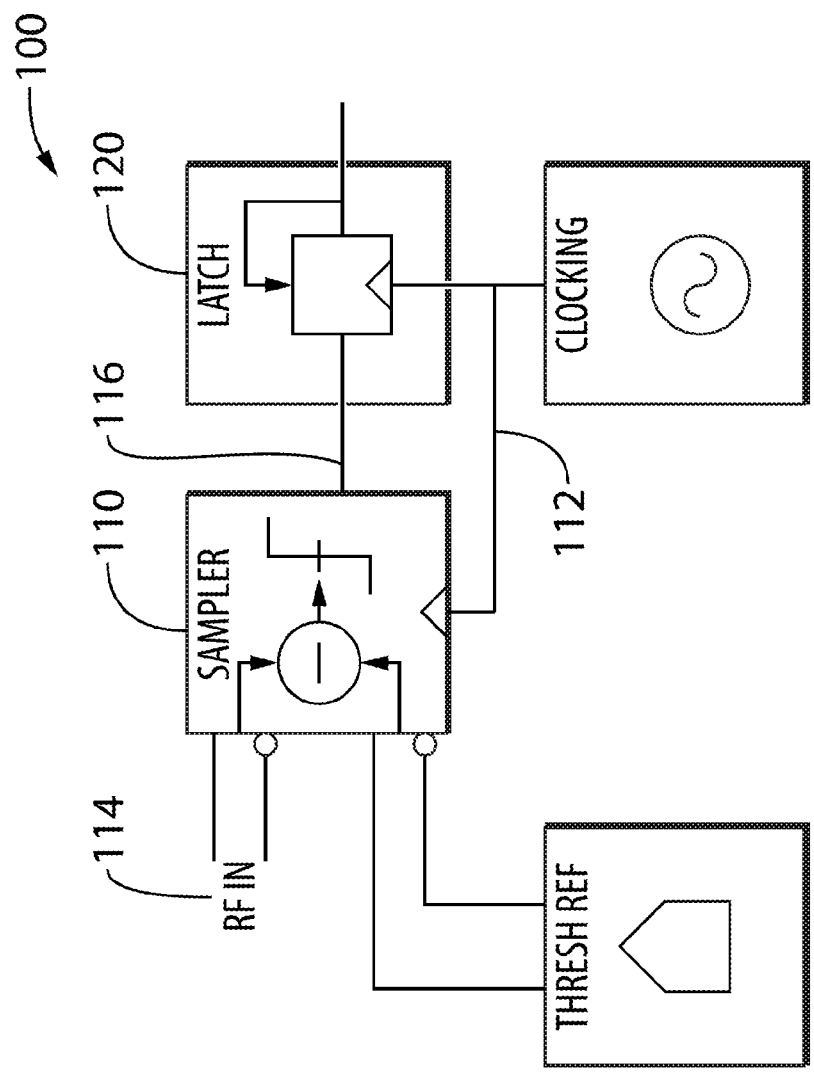
FIG. 8 illustrates a block diagram of a sampling threshold detector in a simplified configuration according to an embodiment of the present disclosure.

FIG. 8 illustrates a block diagram of a sampling threshold detector 100 in a first configuration according to an embodiment of the present disclosure. In its simplest form, illustrated in FIG. 8, an example embodiment of the sampling threshold detector 100 comprises a high bandwidth sampler 110, asynchronously clocked at a specific frequency 112, as noted above, to insure intermodulation products are out of band. In this embodiment, an RF signal 114 is passed directly into the high bandwidth sampler 110, clocked at the specific frequency 112, capturing whether or not the input signal exceeds the static reference threshold. This digitized status 116 is then passed to a latch 120 which holds the status until it is handed off to a control system (not shown) surrounding the detector 100.

Figure 9A:
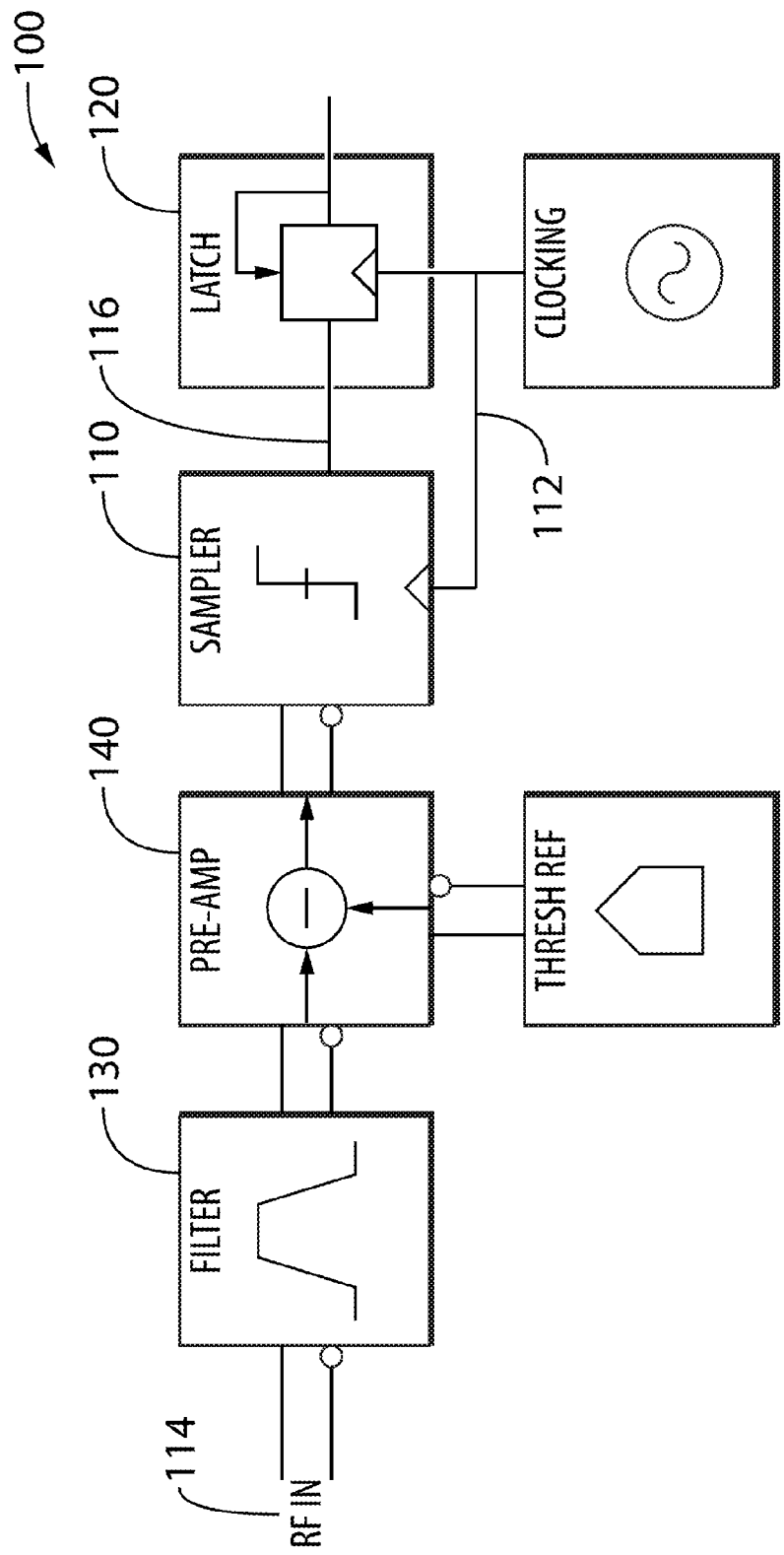
FIG. 9A and FIG. 9B illustrate a block diagram of a sampling threshold detector according to another embodiment of the present disclosure.
Figure 9B:
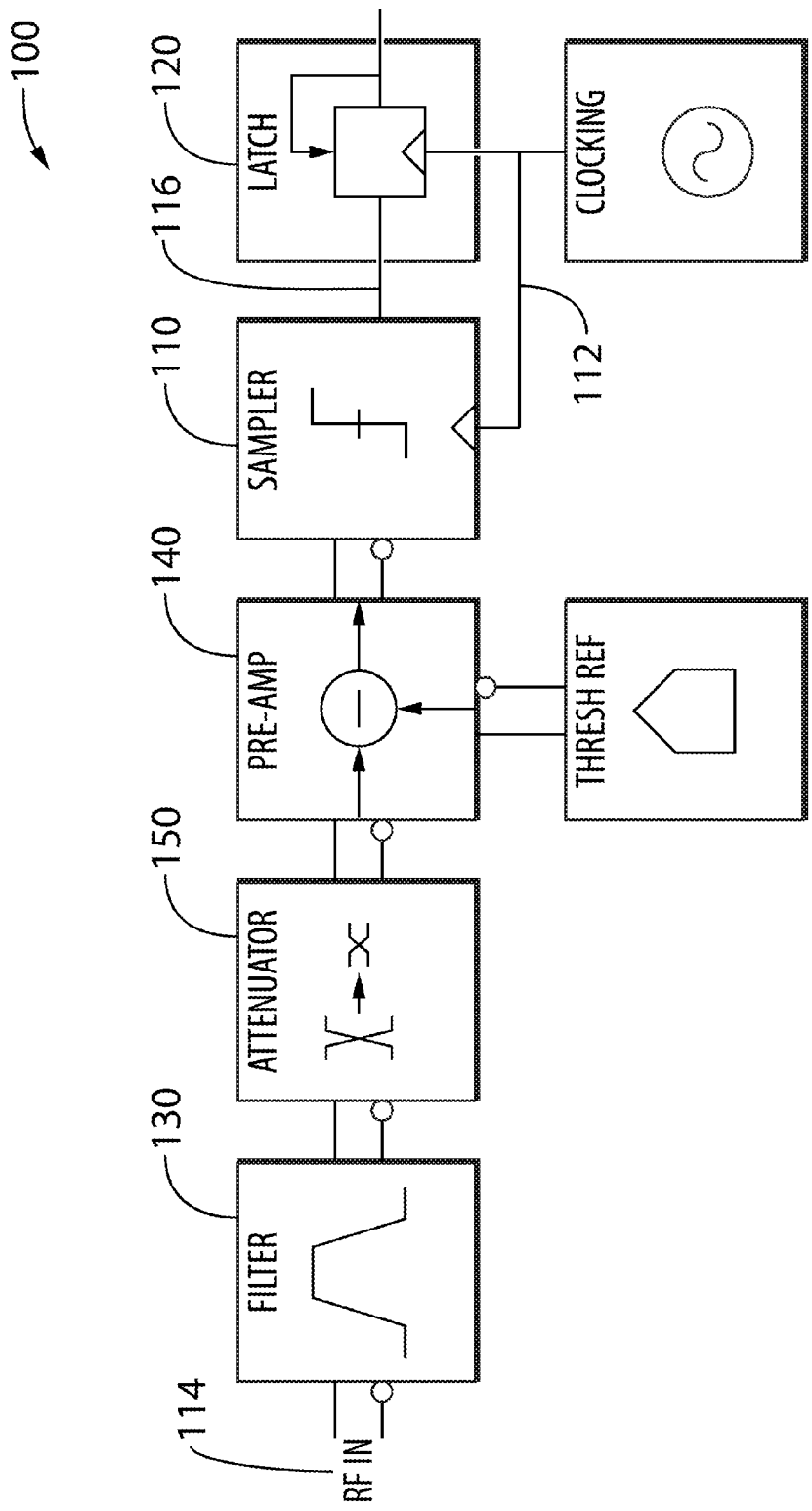

FIG. 9A and FIG. 9B illustrate a block diagram of a sampling threshold detector according to another embodiment of the present disclosure. In FIGS. 9A and 9B, the embodiment of FIG. 8 is expanded to provide a pre-amplifier 140 as a distinctly separate function from the sampler. In an example embodiment, the pre-amplifier is a continuous time pre-amplifier. In FIGS. 9A and 9B, a filter stage 130 is provided before the pre-amplifier 140 on the RF input, thereby capturing the peak of the signal within a particular frequency band (i.e. high pass, low pass or band pass filter). In an embodiment in which it is desirable to drive an AGC loop for signals above a certain cut-off frequency and allow the system to clip low frequency signals, a high pass filter is provided before the detector, causing the loop to converge on the desired amplitude for signals that pass through the filter; for signals that are blocked by the filter, the system would clip. FIG. 9B illustrates an example embodiment in which an attenuator 150 is provided between the filter 130 and the pre-amplifier 140.

Figure 10:
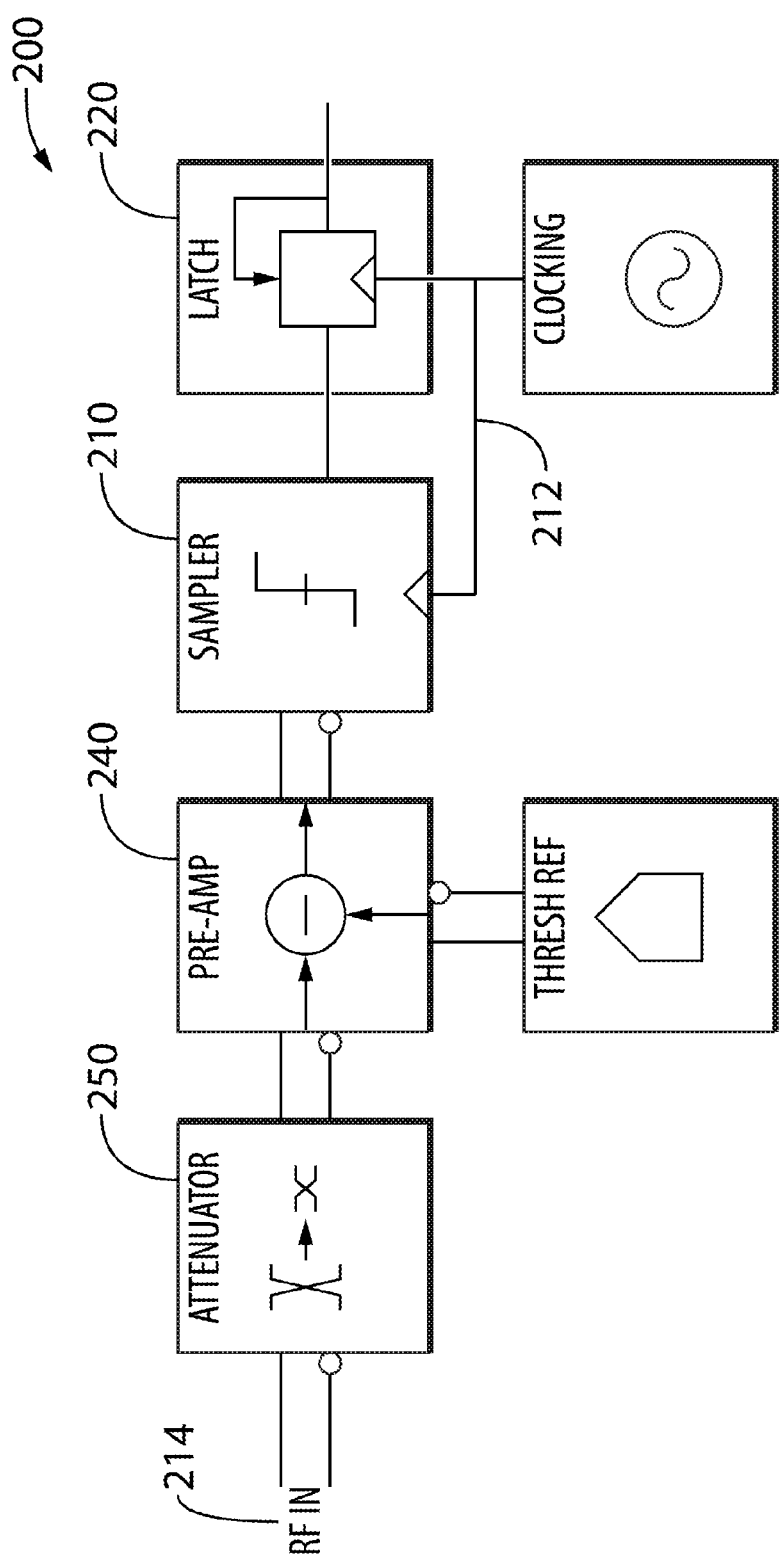
FIG. 10 illustrates a block diagram of a sampling threshold detector in a second configuration according to an embodiment of the present disclosure.

FIG. 10 illustrates a block diagram of a sampling threshold detector 200 in a second configuration according to an embodiment of the present disclosure. In this more sophisticated embodiment, an RF signal 214 is first passed through a passive attenuator 250. This allows the detector to monitor higher voltages that would otherwise be possible and provides a reverse path attenuation of any noise that may be generated by the sampling circuitry.

The attenuator 250 is followed by a pre-amplifier 240, used to subtract a static, but programmable, threshold voltage from the incoming signal. In an example embodiment, the pre-amplifier is a continuous time pre-amplifier. The resulting output remains negative for all input signals except those that exceed the programmed threshold voltage. A high bandwidth sampler follows, clocked at a specific frequency as noted above, to sample the pre-amplifier output looking for over-threshold conditions which would indicate that the signal under observation has exceeded the threshold. This digitized status is then captured by a latch which holds the status until it is handed off to the control system surrounding the detector.

Embodiments of the present disclosure enable the implementation of systems with maximized dynamic range, due to better control over the sensitive automatic gain control (AGC) loops in place without losing range due to inaccuracies of an analog detector.

In an example embodiment, a clock frequency, dynamically chosen as a function of $f_{LO}$ and $f_{IF}$, positions kickback intermodulation products safely out-of-band and enables the use of a sampling threshold detector to directly monitor an RF signal In an example embodiment, candidate sampling frequencies are pre-calculated by any number of mechanisms and tabularized according to which input signals they can recover. A table is stored on-chip where the signal strengths and center frequencies of all distortion products for candidate frequencies is the input to the table, and the output result is the best frequency for the sampler.

In an example embodiment, candidate sampling frequencies are calculated on the fly based on the configuration of the overall system according to some equation, such as $f_{IF}=f_{LO} f_{RF}$. This is only one such equation for calculating candidate frequencies. Of the candidate frequencies, all intermodulation products must be calculated to an appropriate order, and it must be determined where they will be folded to in the IF band. If they are out of band, or of low enough relative power, in band, to that of the desired signal, they may be acceptable.

In an example embodiment, $f_{LO}$ itself is an ideal sampling frequency, if the sampler can be operated at that frequency, as it places the nearest intermodulation products immediately outside of the IF band of interest, as well as a constructive interference product directly at $f_{IF}$, which is acceptable.

In an example embodiment, the signal path of the sampling detector utilizes isolation stages to further suppress kickback to the RF signal under observation. In an example embodiment, a passive attenuator, comprised of a capacitive divider, provides common mode isolation and signal attenuation in forward (and reverse) paths. In an example embodiment, a summation pre-amp allows a gain stage for isolation, acting on both signal and thresholds simultaneously, avoiding a dependence on the actual magnitude of that gain.

An accurate sampling threshold detector is detailed herein which can be applied directly to RF signal paths, enabling accurate measurement of signal amplitude for tight amplitude control of signal paths.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed:

1. A sampling threshold detector for monitoring a radio frequency (RF) signal in a receiver having a mixer for generating a baseband intermediate frequency (IF) signal from the RF signal, the IF signal having a band of interest, the detector comprising:
an input for receiving a threshold voltage value, the threshold voltage value for comparing to an amplitude of the RF signal;
a clocked sampler configured to sample the RF signal at a sampling clock frequency ($f_{SAMP}$) and to generate a status signal when the amplitude exceeds the threshold voltage value,
wherein the sampling clock frequency ($f_{SAMP}$) produces kickback intermodulation products at an output of the mixer, and the sampling clock frequency ($f_{SAMP}$) is chosen based on a local oscillator frequency ($f_{LO}$) of the mixer in order to position the kickback intermodulation products outside of the band of interest of the IF signal.

2. The sampling threshold detector of claim 1 wherein the clocked sampler comprises a single high bandwidth sampler.

3. The sampling threshold detector of claim 1 wherein the sampling clock frequency ($f_{SAMP}$) is determined based on the local oscillator frequency (f Lo) and a baseband intermediate frequency ($f_{IF}$).

4. The sampling threshold detector of claim 3 wherein the sampling clock frequency ($f_{SAMP}$) is determined according to $f_{SAMP}=f_{LO}+N*f_{IF}$, where N is an integer that results in a positive sampling frequency within an acceptable operating range of the clocked sampler.

5. The sampling threshold detector of claim 1 further comprising a machine readable memory storing a set of candidate sampling clock frequency values from which the sampling clock frequency for the clocked sampler is selected.

6. The sampling threshold detector of claim 1 further comprising:
a passive attenuator configured to receive the RF signal to monitor higher voltages to provide a reverse path attenuation of noise generated by the clocked sampler; and
a continuous time pre-amplifier configured to receive the output of the passive attenuator and to subtract the threshold voltage value therefrom, wherein the threshold voltage value is provided by a static programmable threshold voltage, and to provide a resulting signal to the clocked sampler as the RF signal to be sampled.

7. The sampling threshold detector of claim 6 further comprising:
a filter provided before the continuous time pre-amplifier and configured to capture a peak of the RF signal within a particular frequency band.

8. The sampling threshold detector of claim 1 wherein the clocked sampler comprises a single high bandwidth sampler directly attached to the RF signal, enabling direct monitoring of the RF signal.

9. A method of sampling threshold detection comprising:
monitoring a radio frequency (RF) signal using a single high bandwidth clocked sampler in a receiver having a mixer for generating a baseband intermediate frequency (IF) signal from the RF signal, the IF signal having a band of interest;
selecting a sampling clock frequency ($f_{SAMP}$) based on a local oscillator frequency ($f_{LO}$);
sampling an amplitude of the RF signal at the selected sampling clock frequency ($f_{SAMP}$); and
generating a status signal when the amplitude exceeds a threshold voltage value,
wherein the sampling clock frequency ($f_{SAMP}$) produces kickback intermodulation products at an output of the mixer, and selecting the sampling clock frequency ($f_{SAMP}$) comprises positioning the kickback intermodulation products outside the band of interest of the IF signal.

10. The method of claim 9 further comprising:
pre-calculating intermodulation products for each signal to be received; and
selecting the sampling clock frequency additionally based on the pre-calculated intermodulation products.

11. The method of claim 10 further comprising:
calculating at run-time intermodulation products for each signal to be received; and
selecting the sampling clock frequency additionally based on the pre-calculated intermodulation products.

12. The method of claim 9 wherein a final folded results of the kickback intermodulation products are positioned out of band, or are of low enough power in-band so as to be inconsequential.

13. The method of claim 9 wherein the sampling clock frequency is determined based on the local oscillator frequency ($f_{LO}$) and a baseband intermediate frequency ($f_{IF}$).

14. The method of claim 13 wherein the sampling clock frequency ($f_{SAMP}$) is determined according to $f_{SAMP}=f_{LO}+N*f_{IF}$, where N is an integer that results in a positive sampling frequency within the acceptable operating range of the clocked sampler.

15. The method of claim 9 further comprising storing a set of candidate sampling clock frequency values from which the sampling clock frequency for the single high bandwidth clocked sampler is selected.

16. The method of claim 9 further comprising:
   receiving the RF signal to monitor higher voltages to provide a reverse path attenuation of noise generated by the clocked sampler; and
   subtracting the threshold voltage value from the RF signal, wherein the threshold voltage value is provided by a static programmable threshold voltage, to provide a resulting signal to the clocked sampler as the RF signal to be sampled.

17. The method of claim 9 further comprising: capturing a peak of the RF signal within a particular frequency band.

18. The method of claim 9 further comprising directly monitoring the RF signal by sampling the RF signal using the single high bandwidth clocked sampler directly attached to the RF signal.

* * * * *